F. CONRAD.
OVERLOAD AND REVERSE CURRENT RELAY DEVICE.
APPLICATION FILED MAR. 15, 1909.
934,391.
Patented Sept. 14, 1909.
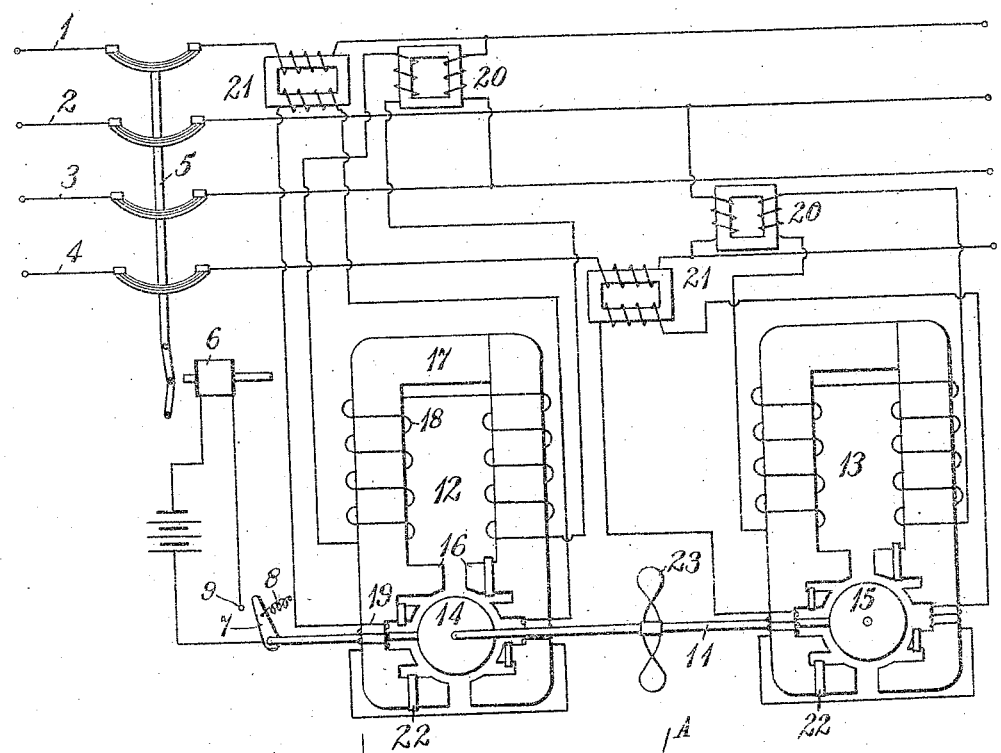
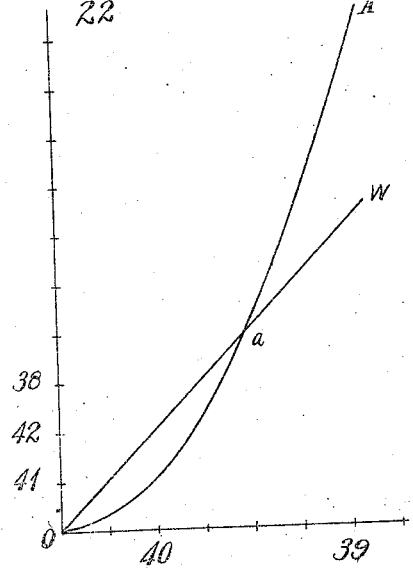
WITNESSES:
Fred H Miller
Otto S. Schainer
INVENTOR
Frank Conrad
BY
Wesley G. Carr
ATTORNEY

UNITED STATES PATENT OFFICE.

FRANK CONRAD, OF SWISSVALE, PENNSYLVANIA, ASSIGNOR TO WESTINGHOUSE ELECTRIC & MANUFACTURING COMPANY, A CORPORATION OF PENNSYLVANIA.

OVERLOAD AND REVERSE CURRENT RELAY DEVICE.

934,391.  Specification of Letters Patent.  Patented Sept. 14, 1909.

Original application filed May 8, 1905, Serial No. 259,388. Divided and this application filed March 15, 1909. Serial No. 483,659.

*To all whom it may concern:*

Be it known that I, FRANK CONRAD, a citizen of the United States, and a resident of Swissvale, in the county of Allegheny and State of Pennsylvania, have invented a new and useful Improvement in Overload and Reverse Current Relay Devices, of which the following is a specification, this being a division of my application Serial No. 259,388, filed May 8, 1905.

My invention relates to protective means for electric circuits, and particularly to relay devices that control the operation of circuit-protective apparatus.

The object of my invention is to provide a relay device which shall insure operation of the circuit-protective apparatus when the direction of the drop of potential in the circuit becomes reversed, or when the current traversing the circuit exceeds a predetermined amount, regardless of the voltage or power factor of the circuit.

Relay devices of the general character indicated above have usually embodied means for producing a force or torque approximately proportional to the product of the current, voltage and power factor of the circuit it was intended to protect. Such devices have operated imperfectly, because when an undue amount of current traverses a circuit, the voltage and power factor of the circuit may drop considerably and consequently sufficient torque may not be exerted to operate the instrument and trip the circuit-breakers when it is most necessary that the circuit-breakers be opened. Means have sometimes been embodied in such devices for increasing the torque in proportion to decrease in voltage, but the devices have usually been very complex in structure, and, so far as I am aware, no relay device has heretofore been constructed that was operative regardless of changes both in voltage and in power factor.

Besides the usual wattmeter device for producing a torque, my invention embodies a torque-producing means that is responsive to the amount of current traversing the circuit, the two torques being normally opposed. If the current traversing the circuit exceeds a predetermined amount, the torque that is dependent upon the current alone may exceed that which is dependent upon the product of current, voltage and power factor (which, as before explained, may be small on account of the decrease in voltage and power factor) by such an amount as to effect operation of the device and cause the circuit-breaker to open. If, for any reason, the current reverses its direction; that is, if the direction of the drop of potential in the circuit becomes reversed, the two torques act in the same direction, and if the total torque exceeds a predetermined amount, the device will operate and cause the circuit-breaker to open.

Figure 1 of the accompanying drawing illustrates, diagrammatically, a system embodying my invention, and Fig. 2 is a diagram of torque curves pertaining to my invention.

A polyphase supply circuit, comprising conductors 1, 2, 3 and 4, is protected by means of a circuit breaker 5 that is provided with a tripping coil 6, the circuit of which is opened and closed by means of a switch arm 7 that is normally maintained in open circuit position by means of a spring 8, and is adapted to be moved into engagement with the contact terminal 9 by means of a movable member, such as a shaft 11 of the protective relay constituting the present invention. The relay comprises, further, two devices 12 and 13 each of which is adapted to operate both as a wattmeter and as an ammeter, the wattmeter and ammeter torques being normally opposed. The movable elements of the devices 12 and 13 are cylinders 14 and 15 of conducting material that are mounted upon the shaft 11 and rigidly connected thereby. Each of cylinders 14 and 15 is embraced by opposing concave polar projection 16 of a U-shaped magnetizable core 17, that is provided with a main winding 18 upon its body portion and with an auxiliary winding 19 that is located in slots in the polar projection 16 and surrounds the ends of the U-shaped core. The windings 18 are supplied with current from transformers 20 that are connected, respectively, between conductors belonging to different phases of the supply circuit, and the windings 19 are supplied with current from transformers 21 the primary windings of which are connected in series with conductors belonging, respectively, to different phases of the supply circuit. It will be noted that the connections and arrangements of the circuits are such that devices 12 and 13 are associated with different phases of the supply circuit, so that the relay will respond, by reason of the rigid connection between the movable members 14 and 15 of the devices, to abnormal conditions existing in either of the phases of the circuit. The recess in the polar projections of the magnetizable core of each device divides the said polar projections into two parts and each part is recessed for the reception of closed circuit windings or coils 22 that effect displacement of the phase of the portions of the fluxes that traverse the spaces between the polar projections. The said coils coöperate with the winding 19 to cause a torque to be exerted upon the movable member of the device that is dependent only upon the amount of current traversing the supply circuit, and the windings 18 and 19 coöperate to cause a torque to be upon the movable member of the device that is dependent upon the amount of energy traversing the supply circuit, and these torques normally oppose each other. In order to retard the movements of the shaft 11 and the switch arm 7, the shaft may be provided with any suitable retarding device, such as fan blades 23.

The operation of the system may be understood from a consideration of the curves of Fig. 2, in which the abscissæ are proportional to the amount of current traversing a circuit and the ordinates are proportional to the torques exerted upon the conducting disks. A curve A represents the variations in the torque due to variations in the amount of current, and it has approximately the form of a parabola, since the torque varies approximately in proportion to the square of the current. Curve W is that of the wattmeter device, and. for 100 per cent. power factor, it is approximately a straight line, since the torque of the wattmeter device is approximately proportional to the first power of the current. The two curves cross at a point $a$, under which conditions the two torques are exactly balanced.

Now let it be assumed that to move the switch-arm 7 against the force exerted by the spring 8, a torque is required which is equal to that represented by the length of the ordinate 0–38. Then when the current traversing the circuit either equals or exceeds that represented by the length of the abscissæ 0–39, the torque exerted by the ammeter device will exceed that exerted by the wattmeter device by an amount either equal to or in excess of that represented by the length of the ordinate 0–38, and the switch-arm 7 will then be moved into engagement with the contact terminal 9, thereby completing the circuit of the operating magnet winding 6 and causing the circuit-breaker 5 to open. If a current equal to that represented by the length of the abscissa 0-40 traverses the circuit in a direction opposite to the normal direction, the torque exerted by the ammeter device will be represented by the length of ordinate 0–41 and the torque exerted by the wattmeter device will be represented by the length of the ordinate 0–42. These two torques will act in the same direction so that the total torque will be represented by the sum of the ordinates 0—41 and 0-42 and will be equal to the torque represented by the ordinate 0–38. If the sum of the torques is equal to or exceeds the length of ordinate 0–38, the switch-arm 7 will be moved into engagement with the contact terminal 9, the operating magnet winding 6 will be energized and the circuit-breaker 5 will be caused to open. It will be noted that the switch-arm 7 moves into engagement with the contact terminal 9 whether operated on account of an excessive current in the supply circuit or on account of a reversal of the direction of the drop of potential, because the direction of the torque of the wattmeter mechanism changes when the direction of the drop of potential in the circuit reverses.

I claim as my invention:

1. The combination with a movable conducting member, a magnetizable core comprising a yoke and pole pieces having reduced portions and projections adjacent to the movable member, of a winding located on the yoke of the core, a winding surrounding the reduced portions of the pole pieces, and closed circuit windings surrounding certain of the pole piece projections.

2. The combination with a supply circuit, a movable conducting member, and a magnetizable core comprising a yoke and recessed pole pieces adjacent to the conducting member, of a magnetizing winding located on the yoke of the core upon which a voltage may be impressed that is proportional to the voltage of the circuit, a winding located in certain of the pole piece recesses that may be supplied with an amount of current which is proportional to the amount traversing the supply circuit, and closed circuit conductors surrounding portions of the pole piece projections.

3. The combination with a supply circuit, a movable conducting member, and a magnetizable core comprising a yoke and recessed pole pieces, of a magnetizing winding located on the yoke of the core on which a voltage may be impressed that is proportional to the voltage of the circuit, a magnetizing winding surrounding the core and located in certain of the pole piece recesses that may be supplied with an amount traversing the circuit, and closed circuit conductors that surround portions of the pole piece projections.

In testimony whereof, I have hereunto subscribed my name this 10th day of March, 1909.

FRANK CONRAD.

Witnesses:
 WM. BRADSHAW,
 B. B. HINES.